US011386453B2

(12) United States Patent
Celik et al.

(10) Patent No.: US 11,386,453 B2
(45) Date of Patent: Jul. 12, 2022

(54) AUTOMATIC EVENT TRIGGERED BALANCE TOP-UP, MONEY TRANSFER, AND LOCATION BASED ADVERTISING PLATFORM

(71) Applicant: OnePIN, Inc., Westborough, MA (US)

(72) Inventors: Feyzi Celik, Hopkinton, MA (US); Marcin Nowak, Westborough, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

(21) Appl. No.: 17/078,473

(22) Filed: Oct. 23, 2020

(65) Prior Publication Data

US 2021/0042785 A1     Feb. 11, 2021

Related U.S. Application Data

(63) Continuation of application No. 16/558,878, filed on Sep. 3, 2019, now Pat. No. 10,861,044, which is a
(Continued)

(51) Int. Cl.
*H04M 3/42* (2006.01)
*G06Q 30/02* (2012.01)
(Continued)

(52) U.S. Cl.
CPC ......... *G06Q 30/0251* (2013.01); *G06F 9/542* (2013.01); *G06F 16/972* (2019.01);
(Continued)

(58) Field of Classification Search
CPC ......... H04M 3/42153; H04M 1/72563; H04M 3/42195; H04M 3/42357; H04M 3/42365;
(Continued)

(56) References Cited

U.S. PATENT DOCUMENTS 6,628,770 B1    9/2003   Jain et al.
6,741,687 B1*   5/2004   Coppage ............... H04M 15/00
                                                                 379/114.01
(Continued)

FOREIGN PATENT DOCUMENTS

WO    WO2009/023591      2/2009
WO    2012047273 A1      4/2012
(Continued)

OTHER PUBLICATIONS

International Search Report and Written Opinion, dated May 1, 2015, International Application No. PCTUS2015/010860, filed Jan. 9, 2015, 17 pages.
(Continued)

*Primary Examiner* — Marcos Batista
(74) *Attorney, Agent, or Firm* — Giordano Law LLC; David A. Giordano

(57) ABSTRACT

This disclosure provides aspects and embodiments of methods, services, and platforms for prompting users with a zero account balance to send a callback message to a contact informing the contact that the user cannot call them and asking the contact to call the user. This disclosure further provides location determining platforms and rewards platforms for users.

6 Claims, 8 Drawing Sheets

Related U.S. Application Data continuation of application No. 15/571,675, filed as application No. PCT/US2016/030859 on May 4, 2016, now abandoned.

(60) Provisional application No. 62/156,723, filed on May 4, 2015.

(51) Int. Cl.

| | |
|---|---|
| *H04M 15/00* | (2006.01) |
| *H04M 7/00* | (2006.01) |
| *H04M 1/2757* | (2020.01) |
| *H04M 1/72406* | (2021.01) |
| *H04M 1/72448* | (2021.01) |
| *H04M 3/493* | (2006.01) |
| *H04W 4/14* | (2009.01) |
| *G06Q 30/00* | (2012.01) |
| *G06Q 50/00* | (2012.01) |
| *H04W 8/18* | (2009.01) |
| *H04W 8/26* | (2009.01) |
| *G06F 16/958* | (2019.01) |
| *G06F 9/54* | (2006.01) |
| *H04W 4/60* | (2018.01) |
| *H04W 4/16* | (2009.01) |
| *H04W 4/21* | (2018.01) |
| *H04M 1/72445* | (2021.01) |
| *H04W 4/00* | (2018.01) |
| *G06F 16/955* | (2019.01) |

(52) U.S. Cl.
CPC ......... *G06Q 30/01* (2013.01); *G06Q 30/0201* (2013.01); *G06Q 30/0203* (2013.01); *G06Q 30/0207* (2013.01); *G06Q 30/0245* (2013.01); *G06Q 30/0267* (2013.01); *G06Q 50/01* (2013.01); *H04M 1/2757* (2020.01); *H04M 1/72406* (2021.01); *H04M 1/72448* (2021.01); *H04M 3/42059* (2013.01); *H04M 3/42102* (2013.01); *H04M 3/42153* (2013.01); *H04M 3/42195* (2013.01); *H04M 3/42357* (2013.01); *H04M 3/42365* (2013.01); *H04M 3/4931* (2013.01); *H04M 7/0042* (2013.01); *H04M 15/58* (2013.01); *H04M 15/62* (2013.01); *H04M 15/705* (2013.01); *H04M 15/735* (2013.01); *H04M 15/7556* (2013.01); *H04M 15/80* (2013.01); *H04M 15/84* (2013.01); *H04M 15/844* (2013.01); *H04M 15/848* (2013.01); *H04M 15/852* (2013.01); *H04M 15/856* (2013.01); *H04W 4/14* (2013.01); *H04W 4/16* (2013.01); *H04W 4/60* (2018.02); *H04W 8/18* (2013.01); *H04W 8/26* (2013.01); *G06F 16/955* (2019.01); *G06Q 30/016* (2013.01); *H04M 1/72445* (2021.01); *H04M 2203/651* (2013.01); *H04M 2203/655* (2013.01); *H04M 2215/8158* (2013.01); *H04W 4/00* (2013.01); *H04W 4/21* (2018.02)

(58) Field of Classification Search
CPC .... H04M 7/0042; H04M 15/58; H04M 15/62; H04M 15/705; H04M 15/735; H04M 15/7556; H04M 15/852; H04W 4/60; H04W 4/16; H04W 8/18; H04W 8/26; G06Q 30/0207; H05M 15/856
USPC ..................... 455/414.1, 405, 407
See application file for complete search history.

(56) References Cited

U.S. PATENT DOCUMENTS

| | | |
|---|---|---|
| 7,924,989 B1 | 4/2011 | Cooper |
| 8,073,460 B1 | 12/2011 | Scofield et al. |
| 8,175,921 B1 | 5/2012 | Kopra |
| 8,249,627 B2 | 8/2012 | Olincy |
| 8,515,803 B2 | 8/2013 | Meyer et al. |
| 8,712,371 B2 | 4/2014 | Baker et al. |
| 8,934,876 B1 | 1/2015 | Cohen |
| 8,971,860 B2 | 3/2015 | Olincy |
| 8,989,712 B2 | 3/2015 | Wentker et al. |
| 10,540,693 B1 | 1/2020 | Monsowitz et al. |
| 2002/0159387 A1 | 10/2002 | Allison et al. |
| 2003/0065778 A1 | 4/2003 | Malik |
| 2004/0252816 A1 | 12/2004 | Nicolas |
| 2005/0064879 A1 | 3/2005 | McAvoy |
| 2005/0186939 A1 | 8/2005 | Barnea et al. |
| 2005/0233733 A1 | 10/2005 | Roundtree et al. |
| 2005/0289095 A1 | 12/2005 | Ruahala et al. |
| 2006/0271425 A1 | 11/2006 | Goodman |
| 2006/0285661 A1 | 12/2006 | Patel et al. |
| 2007/0047494 A1* | 3/2007 | Cordone ............... H04B 17/345 370/335 |
| 2007/0047523 A1 | 3/2007 | Jiang |
| 2007/0055995 A1 | 3/2007 | Jiang |
| 2007/0061197 A1 | 3/2007 | Ramer |
| 2007/0106698 A1 | 5/2007 | Elliott et al. |
| 2007/0111748 A1 | 5/2007 | Risbood |
| 2007/0214083 A1* | 9/2007 | Jones ...................... H04L 67/22 705/41 |
| 2007/0281689 A1 | 12/2007 | Altman et al. |
| 2008/0037738 A1 | 2/2008 | Nolan et al. |
| 2008/0075249 A1 | 3/2008 | Zach et al. |
| 2008/0090597 A1 | 4/2008 | Celik et al. |
| 2008/0261635 A1 | 10/2008 | Samiri |
| 2008/0292080 A1 | 11/2008 | Quon et al. |
| 2008/0318554 A1 | 12/2008 | Romppanen et al. |
| 2008/0318555 A1 | 12/2008 | Romppanen et al. |
| 2009/0207983 A1 | 8/2009 | Nour-Omid |
| 2009/0225972 A1 | 9/2009 | Kahn |
| 2009/0265220 A1 | 10/2009 | Bayraktar et al. |
| 2009/0270067 A1 | 10/2009 | Johnson |
| 2009/0280786 A1 | 11/2009 | Ziklik |
| 2009/0290688 A1* | 11/2009 | Peters ................... H04M 3/436 379/37 |
| 2009/0290701 A1 | 11/2009 | Portman et al. |
| 2009/0318122 A1 | 12/2009 | White et al. |
| 2010/0100387 A1 | 4/2010 | Kuiken et al. |
| 2010/0161506 A1 | 6/2010 | Bosenick et al. |
| 2010/0198696 A1 | 8/2010 | Deshpande |
| 2010/0318415 A1* | 12/2010 | Gottlieb ............ G06Q 30/0215 705/14.17 |
| 2010/0325221 A1 | 12/2010 | Cohen et al. |
| 2011/0029380 A1 | 2/2011 | Moukas et al. |
| 2011/0054920 A1 | 3/2011 | Phillips et al. |
| 2011/0076989 A1 | 3/2011 | Lynch |
| 2011/0119126 A1 | 5/2011 | Park et al. |
| 2011/0131421 A1 | 6/2011 | Jogand-Coulomb et al. |
| 2011/0151838 A1 | 6/2011 | Olincy |
| 2011/0151852 A1 | 6/2011 | Olincy |
| 2011/0287746 A1 | 11/2011 | Gopinath et al. |
| 2012/0057689 A1 | 3/2012 | Martin |
| 2012/0101989 A1 | 4/2012 | Ring et al. |
| 2012/0166271 A1 | 6/2012 | Wofford et al. |
| 2012/0196564 A1* | 8/2012 | Yi ........................ H04M 15/854 455/406 |
| 2012/0238251 A1 | 9/2012 | Lee et al. |
| 2012/0303455 A1 | 11/2012 | Busch |
| 2012/0315880 A1 | 12/2012 | Peitrow et al. |
| 2012/0316992 A1 | 12/2012 | Oborne et al. |
| 2013/0060703 A1 | 3/2013 | Dala et al. |
| 2013/0086618 A1 | 4/2013 | Klein et al. |
| 2013/0115872 A1 | 5/2013 | Huang et al. |
| 2013/0130661 A1 | 5/2013 | Berner et al. |
| 2013/0144674 A1 | 6/2013 | Kim et al. |
| 2013/0204704 A1 | 8/2013 | Ross et al. |

(56) References Cited

U.S. PATENT DOCUMENTS

| | | |
|---|---|---|
| 2013/0217360 A1 | 8/2013 | Dakin et al. |
| 2013/0238706 A1 | 9/2013 | Desai |
| 2013/0290820 A1 | 10/2013 | Dhanani |
| 2013/0343543 A1 | 12/2013 | Blaisdell et al. |
| 2014/0007214 A1 | 1/2014 | Qureshi et al. |
| 2014/0024361 A1 | 1/2014 | Poon et al. |
| 2014/0026069 A1 | 1/2014 | Dennis |
| 2014/0057610 A1 | 2/2014 | Olincy et al. |
| 2014/0073289 A1* | 3/2014 | Velasco ............. H04W 4/02 455/411 |
| 2014/0156386 A1 | 6/2014 | Willaims |
| 2014/0161249 A1 | 6/2014 | Tolksdorf |
| 2014/0188612 A1 | 7/2014 | Chou et al. |
| 2014/0229238 A1 | 8/2014 | Meyer et al. |
| 2014/0229277 A1 | 8/2014 | Khambete |
| 2014/0257985 A1 | 9/2014 | Gibson et al. |
| 2014/0304068 A1 | 10/2014 | Weinblatt |
| 2014/0329514 A1 | 11/2014 | Meriaz |
| 2014/0329565 A1 | 11/2014 | Mannix et al. |
| 2015/0019307 A1 | 1/2015 | Girard et al. |
| 2015/0038120 A1 | 2/2015 | Larkin |
| 2015/0071427 A1 | 3/2015 | Kelley et al. |
| 2015/0073891 A1 | 3/2015 | Dauneria |
| 2015/0106267 A1* | 4/2015 | Lee .............. G06Q 20/401 705/44 |
| 2015/0149301 A1 | 5/2015 | Dow |
| 2015/0180733 A1 | 6/2015 | Krutzler et al. |
| 2015/0201313 A1 | 7/2015 | Celik et al. |
| 2015/0256672 A1 | 9/2015 | Collart |
| 2015/0327042 A1 | 11/2015 | Kempf et al. |
| 2015/0356548 A1* | 12/2015 | Luna-Rodriguez ...... H04W 4/02 705/39 |
| 2016/0048937 A1 | 2/2016 | Mathura et al. |
| 2016/0063528 A1 | 3/2016 | Zhang |
| 2016/0086160 A1 | 3/2016 | Desai et al. |
| 2016/0135048 A1* | 5/2016 | Huxham ............ H04W 12/06 455/411 |
| 2017/0228789 A1 | 8/2017 | Macgillivray |
| 2018/0007198 A1 | 1/2018 | Rabra et al. |
| 2018/0032997 A1 | 2/2018 | Gordon et al. |

FOREIGN PATENT DOCUMENTS

| | | |
|---|---|---|
| WO | 2012047273 A9 | 4/2012 |
| WO | WO2014/049322 | 4/2014 |

OTHER PUBLICATIONS

International Search Report and Written Opinion, dated Jun. 3, 2016, International Application No. PCT/US2016/013112, filed Jan. 12, 2016., 15 pages.

International Search Report and Written Opinion, dated Aug. 11, 2016, International Application No. PCT/US2016/30634, filed May 4, 2016, 15 pages.

International Search Report and Written Opinion, dated Aug. 11, 2016, International Application No. PCT/US2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

\* cited by examiner ions. The entire
AUTOMATIC EVENT TRIGGERED BALANCE TOP-UP, MONEY TRANSFER, AND LOCATION BASED ADVERTISING PLATFORM

CROSS-REFERENCE TO RELATED APPLICATIONS

This application is a continuation of U.S. application Ser. No. 16/558,878, filed Sep. 3, 2019, now U.S. Pat. No. 10,861,044, which application was a continuation of U.S. application Ser. No. 15/571,675 (abandoned), filed Nov. 3, 2017 as a national stage entry application of International Application No. PCT/US16/30859, filed May 4, 2016, which application claims priority to U.S. Provisional Patent Application No. 62/156,723, filed May 4, 2015. The entire contents of those applications are incorporated herein by reference.

BACKGROUND

MNOs have large proportions of prepaid users. These subscribers often do not remember or are not able to top-up their balances when they need to make calls or send SMS. Having a solution that allows these subscribers to connect ensures they keep their subscription longer and generates more billable traffic.

Additionally, traditional rewards programs offered by brands generally focus on long term point collection and are not well suited for emerging markets where subscribers constantly churn. To achieve success with a rewards based advertising model, the mobile subscriber needs an instant reward for completing the desired behavior (such as clicking a link, viewing a video, or making a purchase). A platform that enables voice and data airtime is ideal because it is instant cash for subscribers and gives immediate gratification. Currently, there is no solution that enables brands to offer this type of rewards-based promotion via a single-click option that functions seamlessly across any mobile device type.

Furthermore, companies are always looking for ways to reach consumers at the right time. Being able to send relevant location based advertising to a mobile user's personal device is a unique engage consumers. Traditional methods employed typically focus on merely pushing a location based SMS to a subscriber. These methods are not interactive and their effectiveness is often not trackable by the brand initiating the advertising. An interactive location based mobile advertising platform that can also be configured to trigger based on a mobile user's actions is an invaluable tool for marketers.

SUMMARY

One aspect of this disclosure provides a computer-implemented method for automatically prompting a user on a mobile device to send a callback message after a triggering event. The method comprises: receiving, at a server, an indication that a call between the mobile device and a destination address has disconnected; receiving, at the server, an indication that the mobile device has a zero account balance; receiving, at the server, a communication comprising the Mobile Station International Subscriber Directory Number (MSISDN) of the mobile device and the destination address; preparing a first callback message comprising one or more first actionable response options; and sending the first callback message to the mobile device.

In some embodiments, the method further comprises receiving at the server a communication comprising the first actionable response option selected on the mobile device. In certain embodiments, the method also comprises determining whether the first actionable response option selected on the mobile device was positive or negative. In still further embodiments, the method additionally comprises logging the first actionable response option selected on the mobile device.

In some embodiments, the method further comprises sending a second callback message to the destination address when the first actionable response option selected on the mobile device was positive. In other embodiments, the method also comprises sending a follow-up message to the mobile device.

Another aspect of this disclosure provides a computer-implemented method for automatically prompting a user on a mobile device to send a callback message after a triggering event. The method comprises: receiving, at the processor in the mobile device, an indication that a call has been unsuccessful; receiving at the mobile device a first callback message comprising one or more first actionable response options; and displaying on the screen of the mobile device the first callback message. In some embodiments, the method also comprises playing an alert tone when the first callback message is displayed.

In certain embodiments, the method further comprises launching an application installed on the mobile device, wherein the application causes the first callback message to be displayed. In some embodiments, the application is installed on the SIM card of the mobile device. In other embodiments, the application is installed on the operating system of the mobile device.

In some embodiments, the first offer message further comprises an Integrated Circuit Card Identifier (ICCID), and the method further comprises comparing the ICCID of the first offer message to the ICCID of the mobile device, wherein a match indicates that further processing of the first offer message is permissible.

In some embodiments, the method further comprises determining whether the mobile device can execute instructions contained in the first offer message. In certain embodiments, the method also comprises determining whether the mobile device is roaming. In other embodiments, the method further comprises receiving, in the application, the first actionable response option selected by the user. In still further embodiments, the method also comprises sending a communication comprising the first actionable response option selected by the user to a server.

This disclosure provides aspects and embodiments of OnePIN's ZeroX™ LocaXion™, and XciteMe™ services. These are a cloud based services, methods, and platforms that interact with a client application residing on the phone—either as a downloadable application from an external site, within the device OS (Operating System) or within a SIM (Subscriber Identity Module) card. The names "Zerox," "LocaXion," and "XciteMe" are used throughout this application to refer to multiple aspects and embodiments of the methods, applications, services, systems, and platforms disclosed herein. The names are not limited to any specific embodiment and can refer to multiple embodiments or individual embodiments. Furthermore, other names are also used to refer to embodiments described herein.

Zerox Description

ZeroX is a personalized call back service subscribers can use when they are not able to top-up their zero balance subscriptions. Subscribers with a zero balance can request call backs from other mobile subscribers. The service reduces subscriber churn and generates more voice and SMS traffic for MNOs (Mobile Network Operators).

The service is targeted at the prepaid subscriber base, but could be used by any mobile subscriber. When a subscriber who has no available balance attempts to make a phone call or send an SMS message, the HLR (Home Location Registry), customer management platform or mobile operator billing platform informs the ZeroX server either via an SMS, a network API, or via web services of the zero balance trigger event. The platform checks to determine if the subscriber has the remote client ZeroX application on his device or SIM (Subscriber Identity Module) card. If the subscriber has the application, a command message is sent to the subscriber which triggers the application on his device. The subscriber sees a promotion which displays on his screen, and in one embodiment, he is able to respond to the suggested offer with a single click. The choices available to the subscriber are fully flexible and are determined by the MNO. These can be changed at any time. For example, in one embodiment an MNO may only wish to provide subscribers with the call me back option, while in other embodiments, other MNOs may wish to also provide a funds transfer option. In one embodiment, the subscriber's response is sent from the application to the ZeroX platform via an SMS, through a short code rated free for the subscriber. The SMS is sent by the remote application. A message is then prepared for the intended recipient (the original attempted call party).

If the subscriber does not have the application, then the platform can send a standard SMS informing the subscriber that they do not have balance and should add sufficient funds. If the MNO has a specific top-up message or a link to a website (or phone number) that is typically included in these messages, all of this information can be configured on the ZeroX platform and included in the standard SMS. The SMS is configurable by the MNO and can be changed at any time.

In some embodiments, ZeroX only works for subscribers who truly have a zero balance. This ensures that subscribers who do not have a zero balance are not able to abuse the system. Abuses with other types of call me back services have occurred in MNOs because subscribers who have balance request call backs from friends and family using a free call back service. Friends, family, and acquaintances become tired of the requests and the services are rendered not very useful. In some embodiments, ZeroX prevents this, and creates a trusted relationship between subscribers. Subscribers who receive a ZeroX message understand that the sender really has no balance and would like a call back or a money transfer.

ZeroX is preferably used with a mobile phone, but can also be used with other devices that can be configured to make phone calls. For example, tablets and other computers that include Skype or Google Voice can be utilized with the service.

Benefits of Zerox

Easy to use: Automatically prompts when a call or SMS is attempted but the subscriber has a no balance. Conveniently appears (no need to remember a short code or USSD string).

Personalized: Uses personalized info (name and phone number) to inform the recipient that a known friend is trying to reach them.

Revenue Generator: Operators increase voice and SMS traffic by enabling a simple and reliable return call mechanism.

Scam Protection: The service can be configured to only work for subscribers with zero balance; thereby preventing misuse.

The above embodiments can also be implemented in a manner where a client application (either on the phone or on the SIM card) is not required. In this instance, a USSD channel is opened and the communications between the mobile subscriber and the platform occur via USSD communications.

LocaXion Summary

The LocaXion service collects a mobile subscriber's location using cell tower IDs and other coordinates collected from the SIM card, mobile phone, and mobile network. The location is sent back to a cloud server platform. Location information can be automatically collected and sent to the server after a variety of trigger points such as:

Any time a subscriber turns on his handset

After a phone call

When a phone call connects to another party

After an SMS is sent

When asked for location from a command sent from the server

After X number of phone calls are made

After a specific, predefined target website is visited

When a subscriber enters into a specific coverage area defined by one or more cell IDs or other network identifiers. This information can be preconfigured within the application. When a subscriber enters a cell site that matches the preconfigured ID then the location information is sent to the server.

Once location information is sent to the server, the server can process the message and determine if subsequent communications should be sent back to the subscriber. In one embodiment, based on the subscriber's location information, a message such as an advertisement may be sent back to the subscriber in the form of SMS, MMS, email, or as a command prompt that triggers a remote client application and which the subscriber can action (provide feedback, a response, etc.). The application can also store commands that will automatically display advertisements when a subscriber enters a specific predefined location. This display can occur automatically and without any communication with the server. Responses and feedback from the subscriber are then sent to the server for collection, analysis, and reporting.

Xciteme Summary

XciteMe is a rewards based service that allows brands, advertisers, and mobile operators, and other entities to reward customers with mobile airtime, a points program, or other types of loyalty and participation rewards. Brands and advertisers are able to create interactive ad campaigns in which all subscribers, regardless of their device type, can participate. An array of embodiments exist that can be employed by companies or brands utilizing the platform. Examples include: Surveys sent to mobile users, requests to participate in a poll, requests to "like" specific brand pages or follow brands on social media sites such as Facebook and Twitter, prompts to watch a video, requests to add a company's phone number to the mobile subscriber's phonebook, or requests to provide the brand an email address. As used herein, the terms "user" and "subscriber" are used interchangeably.

In one exemplary embodiment, Samsung would like subscribers to tell Samsung about their next intended phone purchase. An interactive prompt generated by the XciteMe cloud server is sent to mobile subscribers and processed by a remote client:

"Earn 2 minutes of free talktime! Tell us about your dream phone. Free to participate. Click OK to continue."
"My dream phone is:
iPhone 6
Android device
Samsung Edge 6
Nokia
Other Subscribers make a selection which is automatically sent back to the cloud server. The server communicates via an API into the MNO's billing system providing the MSISDN, date, time, and a unique ID for security and anti-scamming purposes. The subscriber is automatically credited for the free airtime and a communication is provided back to XciteMe server that the credit was successful. The XciteMe platform then generates a confirmation message for the subscriber:

"Thank you for participating! You have been credited 2 minutes of talk time. Stay tuned for future surveys. We will be giving away free Samsung 6 smartphones to participants!"

Benefits of XciteMe Service
  Benefits of the XciteMe platform include
  Increase awareness and acquire more customers
  Expose people to new products
  Increase engagement
  Reach consumers via an intimate channel
  Rapidly collect consumer market data
  Access a permissioned community of engaged consumers (Start the conversation, enhance the conversation)
  Reward users for non-purchase interactions. Encouraging additional interactions can further strengthen loyalty.
  Deepen engagement and reward for "higher level" tasks (answering simple questions→providing demographic information→product purchase)
  Increase sales
Benefits for MNOs
  Attract marketing spend from brands by offering large, segmented permissioned groups of shoppers
  Significant revenue opportunity
  Deceased subscriber churn due to airtime rewards
Benefits for Consumers
  More valuable connection to brands they care about
  Instant gratification
  Immediate, direct, highly valuable rewards

DETAILED DESCRIPTION OF THE FIGURES

Figure 1:
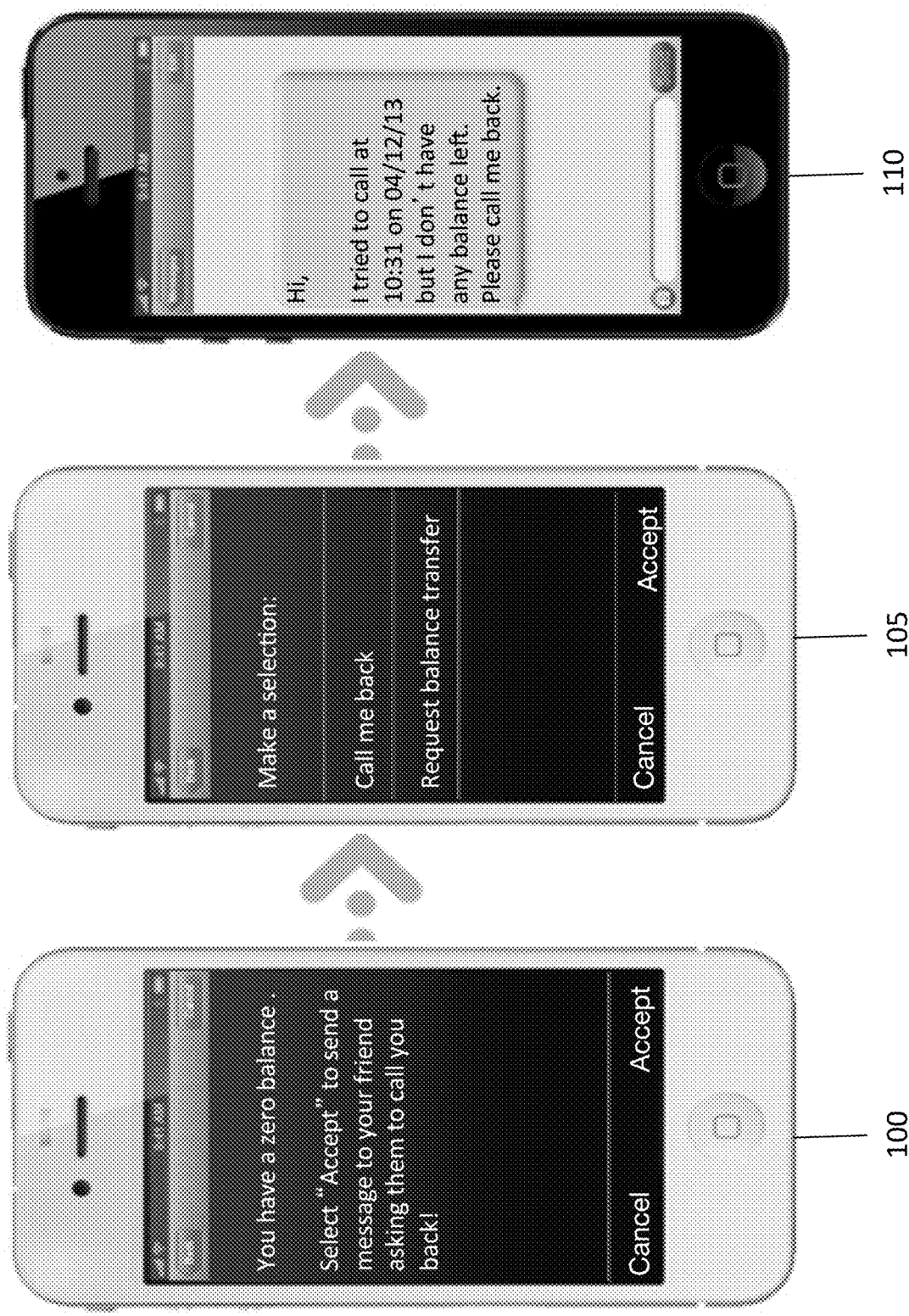
FIG. 1 is a flowchart illustrating exemplary basic architecture of the platform for ZeroX, LocaXion, and XciteMe.

FIG. 1 is a flowchart illustrating exemplary basic architecture of the platform supporting the ZeroX, LocaXion, and XciteMe services. In one embodiment, as pictured in FIG. 2, the services utilize the following connectivity structure: Mobile Subscriber A experiences a trigger event. This could be a zero balance event in the case of the ZeroX embodiment, it could be a phone call placed to a specific brand in the XciteMe embodiment, or could be that a subscriber moved into a specific geographic location in the LocaXion embodiment. The trigger event ("1") is noted by the Operator Switch, data network, SMSC, billing platform, customer management platform, or HLR (Home Location Registry). The MNO network is in constant communication with the cloud platform ("2"). This allows for the Mobile Operator Network to notify the platform when a specific trigger event occurs.

After a trigger event occurs and, subsequently, the required information necessary to trigger a campaign is passed to the platform via an API, the platform processes the information and prepares a campaign message to be sent to a mobile subscriber.

In one embodiment, the platform is connected to a Mobile Network Operator SMSC (Short Message Service Center) via an SMPP (Short Message Peer-to-Peer) connection ("3"). Other connection types in other embodiments are also possible. In some embodiments, the platform may also be connected to an MNO's MMSC (MultiMedia Message Service Center). The Operator SMSC forwards the campaign message to Subscriber A's device ("4").

The notification appears on Subscriber A's device, at which point the subscriber selects his or her preferred option. The remote application within Subscriber A's mobile device forwards the response to a designated short code at the Operator SMSC ("5"). The Operator SMSC receives and forwards the response to the platform in the form of a binary SMS message ("6"). The platform parses the message and determines an appropriate response to Subscriber A based on Subscriber A's device type and interest in the campaign promotion.

In the XciteMe and LocaXion embodiments where Subscriber A provided a positive response the promotion, the platform may send a follow-up message back to the subscriber. This could be a standard SMS or, in alternative embodiments, may be additional command messages that initiate a proactive session. These messages would flow through the MNOs SMSC and MMSC respectively ("7").

The Operator SMSC forwards the contact information to the device user "(8)".

In the ZeroX scenario where Subscriber A did not have sufficient funds and requested a call back or balance transfer, the cloud prepares an SMS message to Subscriber B (9) and forwards this to the MNO SMSC. The SMSC delivers this message to Subscriber B (10). In other embodiments, this could also be a command message sent to Subscriber B that triggers a remote client application on Subscriber B's device. Subscriber B would then experience an interactive prompt and could reply to Subscriber A via the ZeroX service, or initiate a secure funds transfer.

Figure 2:
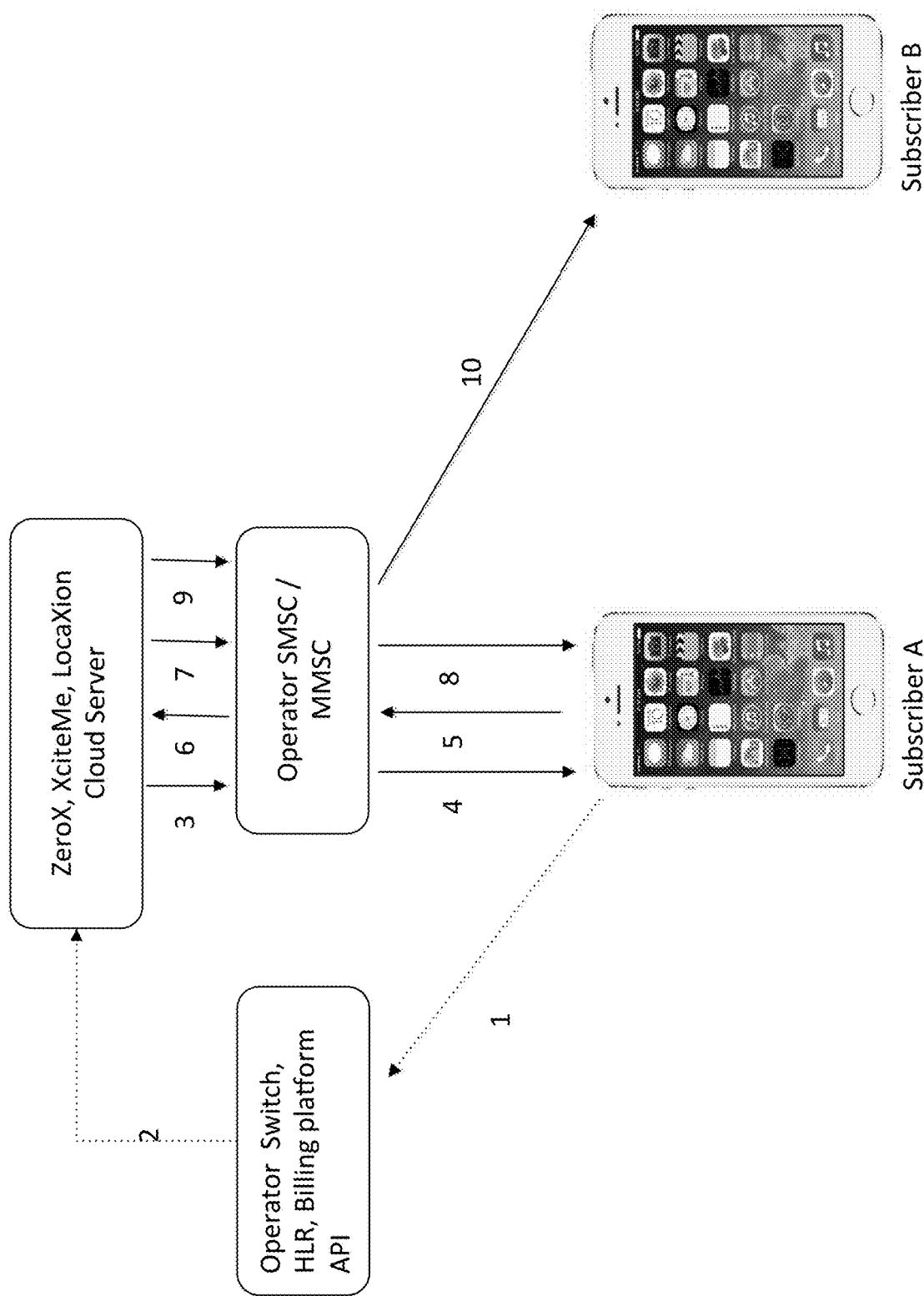
FIG. 2 is a graphical overview illustrating the user interface by which a user may add a phone number directly into his or her mobile phonebook via an interactive prompt.

FIG. 2 showcases the user interface a mobile consumer would see when the ZeroX service triggers and displays prompts to the consumer after an attempted phone call where the user had no balance. In other embodiments, the service could also trigger when the user attempts to initiate a data session or when attempting to send an SMS or MMS without sufficient funds.

An attempted phone call is placed from Subscriber A to another mobile subscriber, Subscriber B. The call is not connected because Subscriber A does not have sufficient balance. In one embodiment, immediately after the phone call ends, a tone is played by the mobile device, and an interactive prompt displays as exemplified by stage 100. The text displayed to the calling party is fully configurable by Mobile Network Operator. In this embodiment, Subscriber A is notified that he has a zero balance, and is asked if he would like to send a free message to Subscriber B.

In the embodiment where the mobile user interacts with the campaign message and chooses to accept the offer, a second selection can be displayed to the subscriber as shown in stage 105. At this stage, Subscriber A has the option of choosing to have Subscriber B call him back, or alternatively can send a request to Subscriber B to transfer funds.

Figure 3:
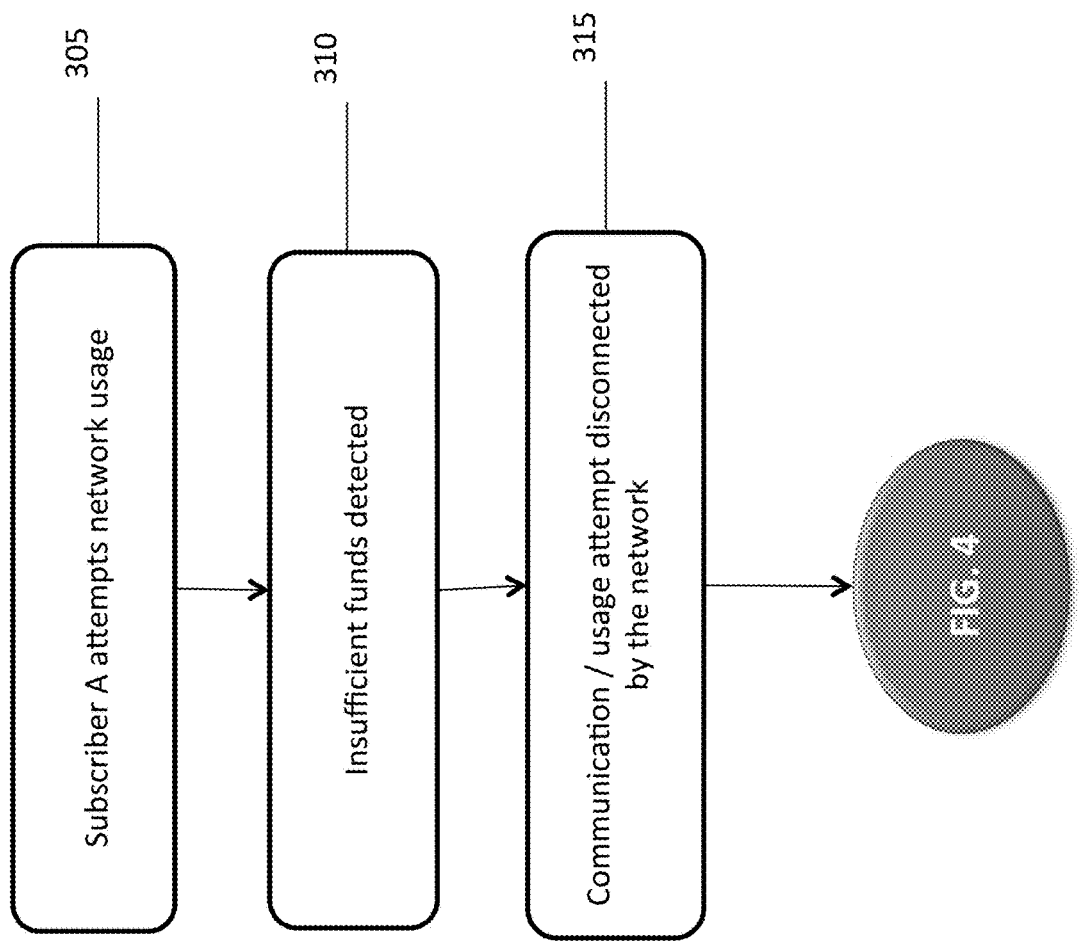
FIG. 3 is a flowchart illustrating exemplary steps related to a trigger event that will lead to the eventual launching of the ZeroX service.

In an embodiment where Subscriber A chooses to send a call-me-back message to Subscriber B, Subscriber B receives a notification as exemplified in stage 110. Subscriber A's name is included in the message so that the notification is personalized. The time and date the attempted call was made are also included:

Hi, it's Chris Jones
I tried to call at 10:31 on Apr. 12, 2013 but I don't have any balance left.
Please call me back.
Sent using ZeroX FIG. 3 is a flowchart illustrating the steps related to a trigger event that will lead to the eventual launching of the ZeroX service. In stage 305, a subscriber (Subscriber A) with a zero balance or with low funds attempts to utilize the mobile network. In one embodiment, a subscriber may attempt to make a phone call to another subscriber. In other embodiments, the subscriber may attempt to send an SMS or MMS or other data communication to another mobile subscriber. At stage 310, the network detects that Subscriber A in stage 305 has insufficient funds to complete the call or message initiated. The network disconnects the call or refuses the SMS messages at stage 315. This series of events triggers the ZeroX service, as outlined in FIG. 4.

Figure 4:
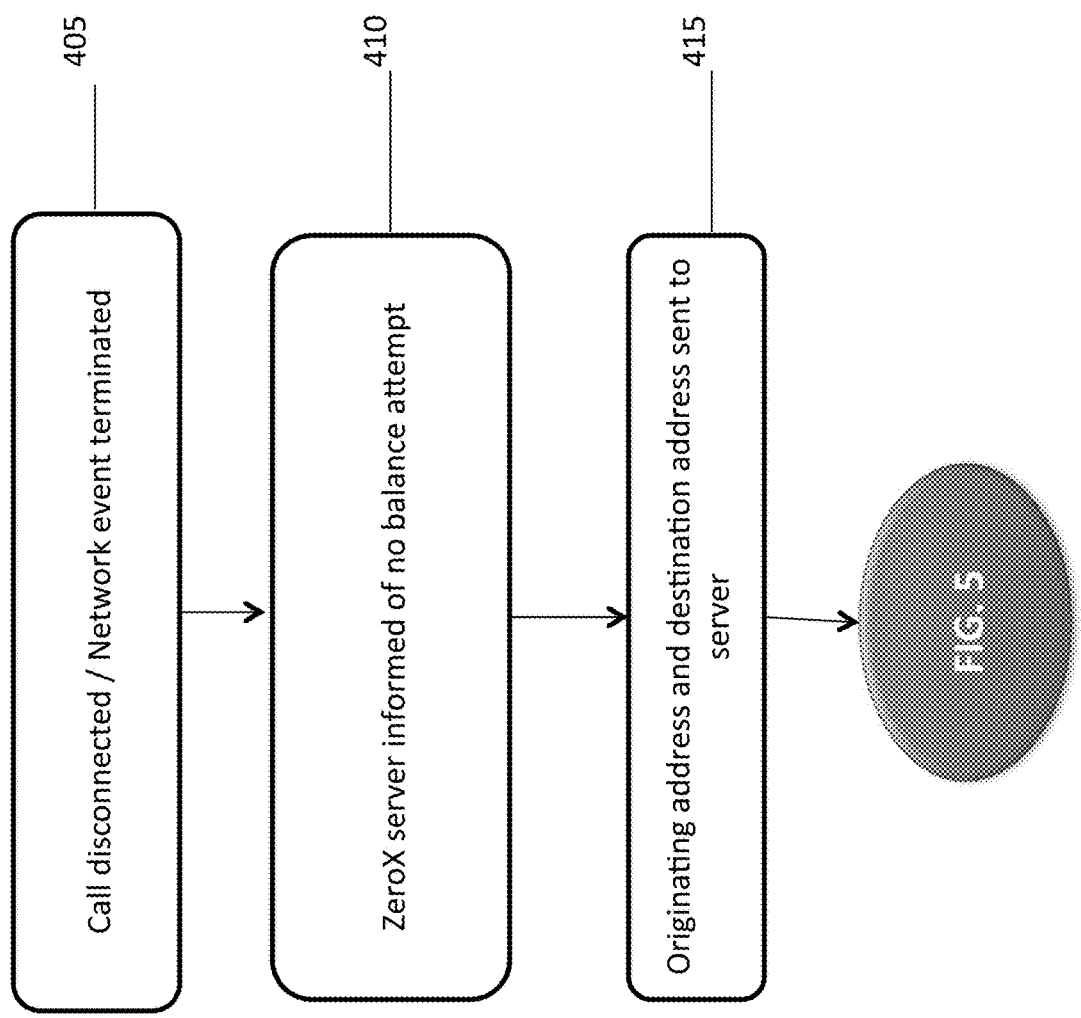
FIG. 4 is a flowchart illustrating an exemplary interaction process between a Mobile Operator network and the ZeroX server platform.

FIG. 4 is a flowchart illustrating the Mobile Operator Network as it would interact with the ZeroX server platform. At stage 405, the mobile phone call placed by Subscriber A is terminated by the network. The mobile operator informs the ZeroX platform that a zero balance communication was attempted at stage 410. This notification could happen via an API, via web services, or via SMS communication where the MNO forwards an SMS to the ZeroX platform with details necessary to trigger the ZeroX service. The time, date, and MSISDN (Mobile Station International Subscriber Directory Number) of the subscriber with no balance is forwarded to the ZeroX platform at stage 415. In some embodiments, the MNO network may also forward an additional ID to indicate if the subscriber had no balance or merely insufficient funds for the communication attempted. In this embodiment, Subscriber A's MSISDN is identified as the OA (Originating Address). The mobile subscriber called is known as the DA (Destination Address). The MNO network also forwards the DA to the ZeroX platform in stage 415.

Figure 5:
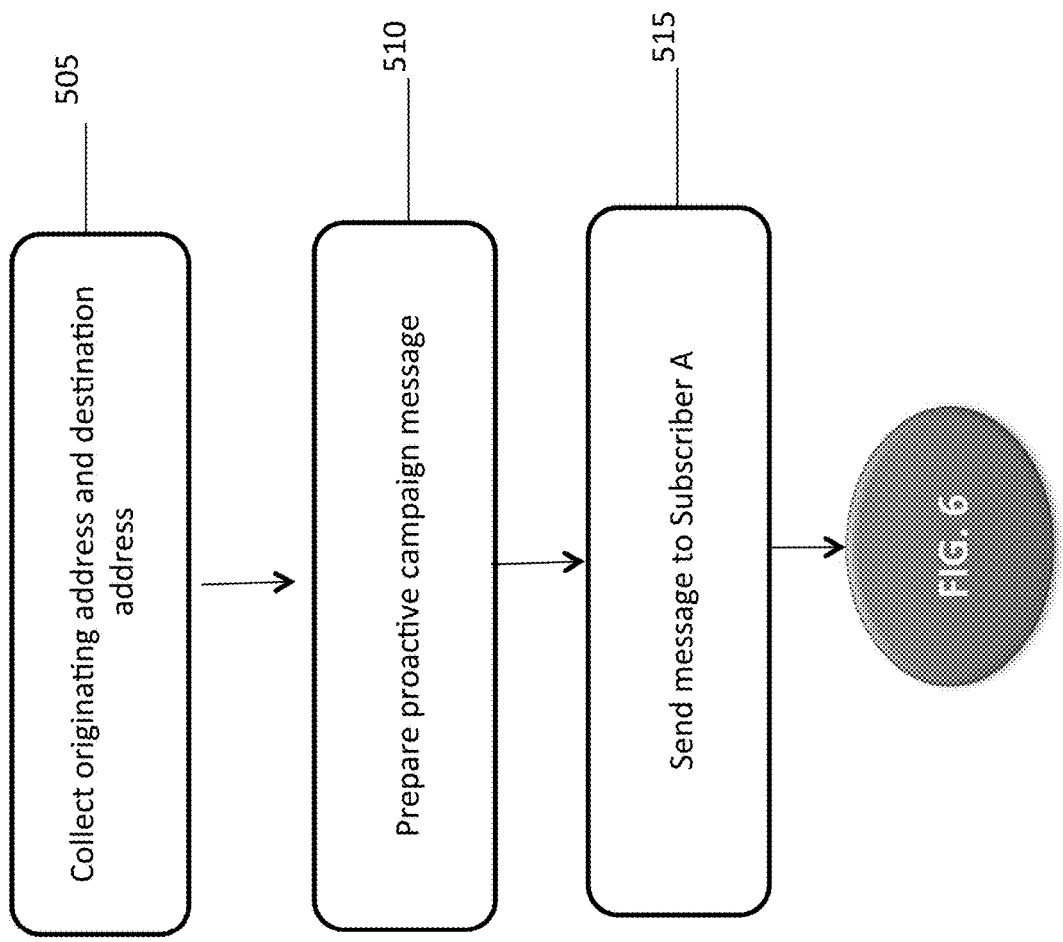
FIG. 5 is a flowchart illustrating an exemplary process of the ZeroX platform sends a command message to a subscriber based on inputs received from the MNO network.

FIG. 5 is a flowchart illustrating the exemplary process of the ZeroX platform sending a command message to a subscriber based on inputs received from the MNO network. At stage 505, the ZeroX platform receives the communication from the MNO network including the OA and DA. The platform prepares an appropriate command message at stage 510, based on the ID and information obtained from the MNO network. The message is sent to the remote client on Subscriber A's device at stage 515.

Figure 6:
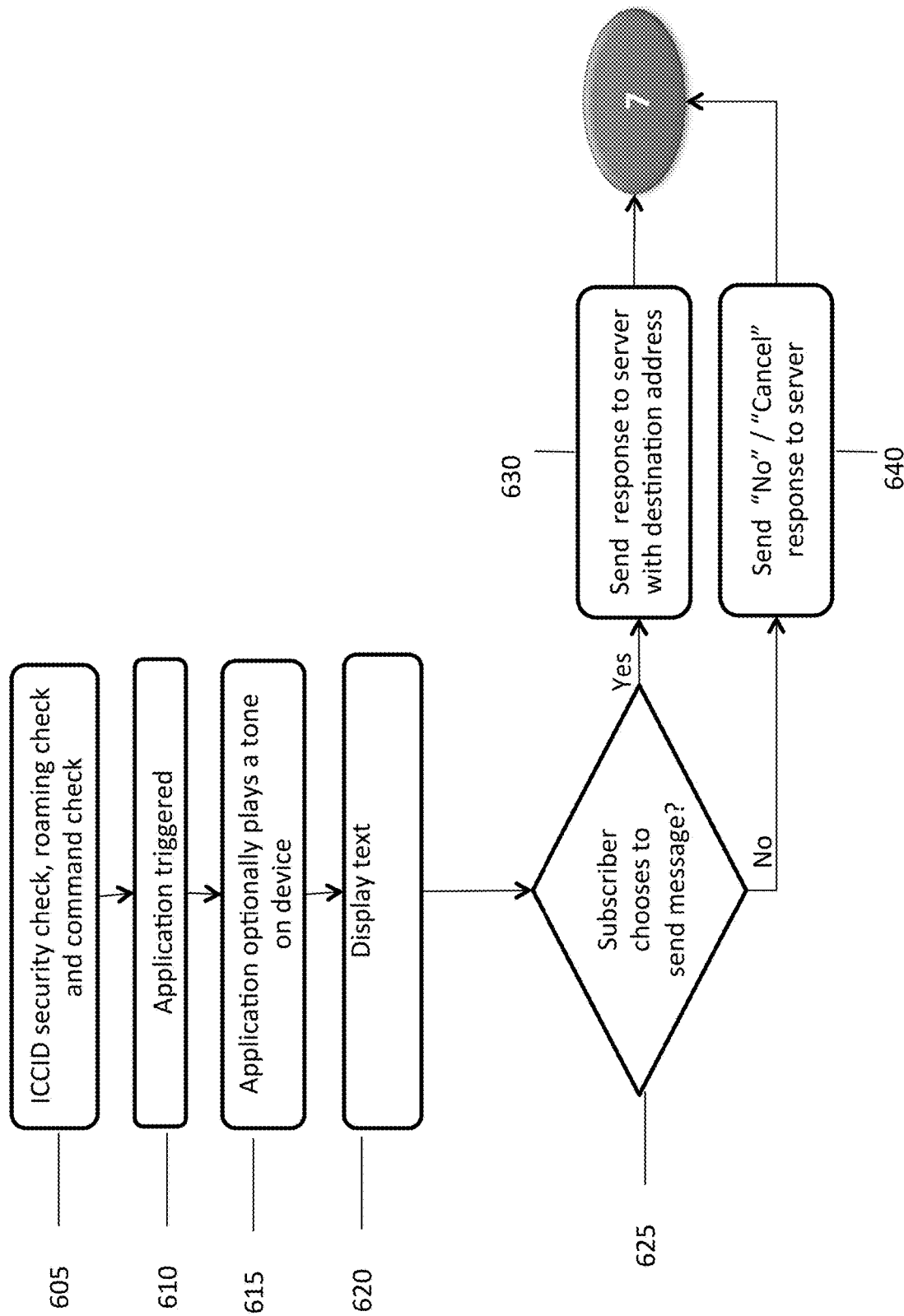
FIG. 6 is a flowchart illustrating an exemplary process of how the ZeroX application is expressed and interacts with the user device, and thus the user experience.

FIG. 6 is a flowchart illustrating the exemplary process of how the ZeroX application is expressed and interacts with the user device, and thus the user experience. At stage 605, the message is received and processed by the remote client application. In some embodiments, the client application may perform an ICCID security check to ensure that the ICCID within the command message issued by the platform matches the ICCID reported by the SIM (Subscriber Identity Module) card in the subscriber's device. In some embodiments, the client application may also perform a roaming check to determine if the mobile user is within his home network. A command check to determine that the device is able to support the issued command can also be included. After all checks are complete, the application triggers at stage 610. In some embodiments, the application can be configured to play an alert tone on the subscriber's device at stage 615. Subsequently, the remote client can display text to the mobile subscriber directly on the device screen—the user does not need to navigate into an SMS inbox or open an application to view the notification. The text displayed to the user is fully configurable in stage 620, and is defined at the platform level. In exemplary embodiment, the mobile user is notified that he does not have sufficient balance to complete his call or send a message to an intended recipient:

"You have a zero balance—your message cannot be sent. Select OK to send a free message to your friend asking them to call you back!"

At stage 625, the subscriber can choose to send a message to Subscriber B, the original intended recipient. The user experience can be configured to require only a single click response. In the embodiment where a subscriber chooses to send a message to Subscriber B, a response is sent from the remote client to the platform at stage 630. The response includes the phone number of the Subscriber B. If the user chooses not to send a message, a response is sent back to the server at stage 640 indicating the user's preference.

Figure 7:
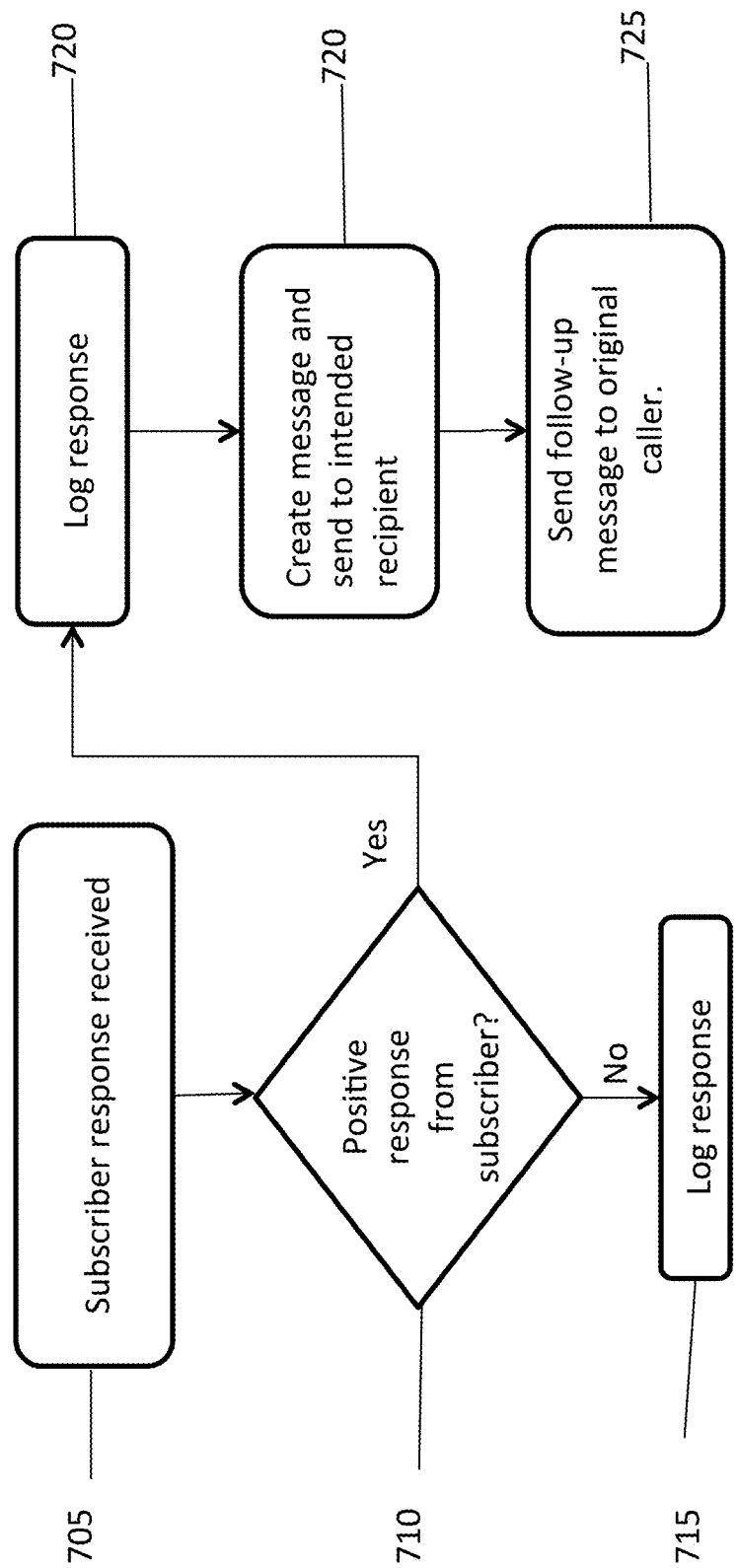
FIG. 7 is a flowchart illustrating an exemplary process of how the ZeroX platform updates the database with subscriber preference results, tracking the participation such that the MNO may modify the frequency of campaign depending on subscriber responsiveness.

FIG. 7 is a flowchart illustrating the exemplary process of how the ZeroX platform updates the database with subscriber preference results, tracking the participation such that the MNO may modify the frequency of campaign depending on subscriber responsiveness.

At stage 705, Subscriber A's selected response to the ZeroX prompt is received at the platform. In stage 710, the server processes the response and determines if the subscriber indicated a positive or negative response. If Subscriber A did not wish to send a ZeroX message to Subscriber B, the platform logs his response for further analysis as indicated at stage 715. If Subscriber A chose to send a ZeroX message to Subscriber B, his response is logged at the platform in stage 720. The platform then creates a message to be sent to Subscriber B. In one exemplary embodiment, the message may state:

"Hi, it's Chris Jones. I tried to call at 10:31 on Apr. 12, 2015 but I don't have any balance left. Please call me back.
Sent using ZeroX"

In one embodiment, the platform may be configured to send a follow-up message to Subscriber A at stage 725. This is a configurable message, and could be utilized to inform Subscriber A that a ZeroX message was sent on his behalf:

"Your call me back request has been sent to 6171234567."

Figure 8:
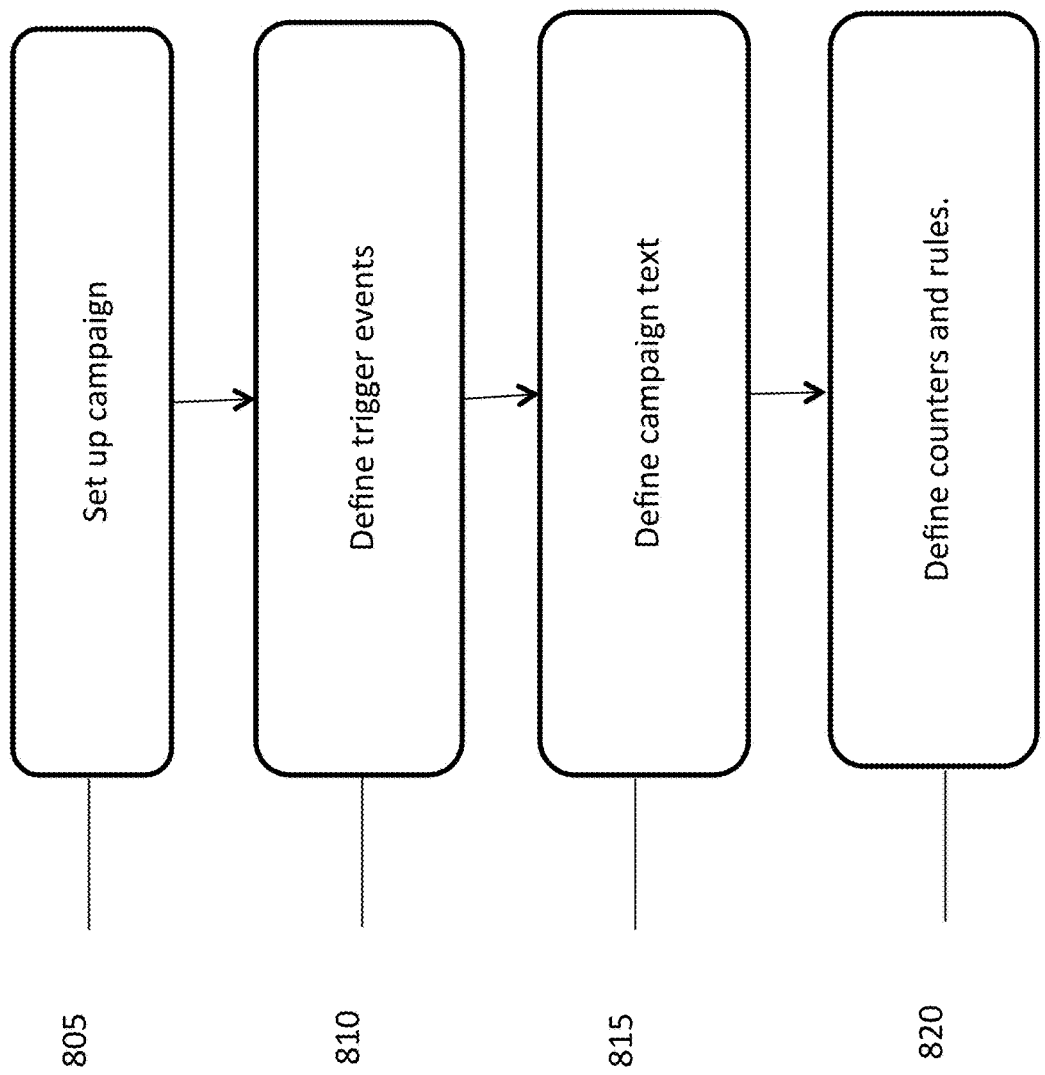
FIG. 8 is a flowchart illustrating an exemplary process of how a ZeroX campaign is designed.

FIG. 8 is a flowchart illustrating the exemplary process of how a ZeroX campaign is designed. At stage 805, the campaign is defined within the server. This includes the days and times during which the campaign will be relevant. Specific geographic regions can also be configured. At stage 810, trigger events after which the campaign should launched are defined. Next, during stage 815, the actual campaign text that will be shown to a calling party is defined. In stage 825, configurable counters and rules for the campaign are set. In one embodiment, this could include the number of times a specific unique mobile subscriber, as defined by his MSISDN, is prompted to send a ZeroX message after attempting to utilize the MNO network with a zero balance.

EQUIVALENTS

It is to be understood that the foregoing description is intended to illustrate and not limit the scope of the invention, which is defined by the scope of the appended claims. Those skilled in the art will recognize, or be able to ascertain, using no more than routine experimentation, numerous equivalents to the specific embodiments described specifically in this disclosure. Such equivalents, and other aspects, advantages, and modifications are within the scope of the following claims.

The invention claimed is:

1. A computer-implemented method for sending a message comprising a request for a funds transfer to a destination mobile device after a call from a mobile device to the destination mobile device has disconnected or after an SMS or MMS message was sent from the mobile device to the destination mobile device, wherein the mobile device is connected to a mobile network, the method comprising:

receiving via the mobile network, at a processor in the mobile device, an indication that a call from the mobile device to the destination mobile device has been disconnected or an indication that an SMS or MMS message was not sent to the destination mobile device;

receiving via the mobile network, at the mobile device, a first message comprising a command message to launch an application and comprising contents indicating that the mobile device has a zero account balance and comprising one or more actionable options, wherein one of the one or more actionable options comprises a request for a funds transfer from the destination mobile device;

launching the application on the mobile device;

displaying, on a screen of the mobile device, the contents and the one or more actionable options, wherein the application causes the contents and the one or more actionable options to be displayed;

receiving, in the application, an indication that the actionable option comprising a request for a funds transfer from the destination mobile device was selected;

preparing a second message comprising the request for funds transfer, wherein the second message is addressed to the destination mobile device; and sending the second message from the mobile device to the destination mobile device via the mobile network.

2. The method of claim 1, wherein the application is installed on a SIM card of the mobile device or an operating system of the mobile device.

3. The method of claim 2, wherein the first message further comprises an Integrated Circuit Card Identifier (ICCID).

4. The method of claim 3, further comprising comparing the ICCID of the first message to the ICCID of the mobile device.

5. The method of claim 1, further comprising receiving a follow-up message on the mobile device, wherein the follow-up message indicates that the request for funds transfer was sent to the destination mobile device.

6. The method of claim 1, wherein the first message is formatted according to a device type of the mobile device.

* * * * *